United States Patent [19]

Jones et al.

[11] Patent Number: 5,020,015

[45] Date of Patent: May 28, 1991

[54] MULTICHANNEL DIGITAL SIGNAL CORRELATOR OR STRUCTURATOR

[75] Inventors: Robin Jones; Martin Johnson, both of Worcester, England

[73] Assignee: The Secretary of State for Defence in Her Britannic Majesty's Government of the United Kingdom of Great Britain and Northern Ireland, London, England

[21] Appl. No.: 359,755

[22] PCT Filed: Nov. 26, 1987

[86] PCT No.: PCT/GB87/00845

§ 371 Date: May 16, 1989

§ 102(e) Date: May 16, 1989

[87] PCT Pub. No.: WO88/04079

PCT Pub. Date: Jun. 2, 1988

[30] Foreign Application Priority Data

Nov. 27, 1986 [GB] United Kingdom ........... 8628397

[51] Int. Cl.⁵ .............................. G06F 15/336
[52] U.S. Cl. ................................. 364/728.03
[58] Field of Search ............. 364/728.03, 728.07

[56] References Cited

U.S. PATENT DOCUMENTS

| | | | |
|---|---|---|---|
| 3,842,252 | 10/1974 | Jakerman et al. | 235/181 |
| 3,878,381 | 4/1975 | Broder et al. | 364/728.06 |
| 4,404,645 | 9/1983 | Elings et al. | 364/728.07 |
| 4,559,607 | 12/1985 | Lu | 364/728.03 |
| 4,593,378 | 6/1986 | McWhirter et al. | 364/900 |
| 4,809,210 | 2/1989 | Pike et al. | 364/728.03 |
| 4,817,014 | 3/1989 | Schneider et al. | 364/728.03 |

FOREIGN PATENT DOCUMENTS 0186987 7/1986 European Pat. Off. .

OTHER PUBLICATIONS

Friberg et al., "New Digital Photoelectric Correlator", Rev. Sci. Instrum. vol. 53 vol. #2 205-209, Feb. 1982.

Primary Examiner—Dale M. Shaw
Attorney, Agent, or Firm—Nixon & Vanderhye

[57] ABSTRACT

A digital cross and auto correlator or structurator receives a stream of pulses of varying time separation forming an input signal. A plurality of channels each receives this input signal which is sampled to provide a series of digital numbers in successive sample time intervals. Each channel has a delay for delaying an input signal to a delay value to provide a delayed signal, and an arithmetic section for receiving at one input a nondelayed input signal and at another input the delayed signal. An accumulator receives the output of the arithmetic section. The collective output of the channels provides the required auto or cross correlation function. The correlator has means in each channel for providing a sample time interval and a delay value that are independent of one another and of other channels. The sample time and delay value are set by the frequency of and phase difference respectively between clock pulses.

11 Claims, 8 Drawing Sheets

Fig.5a. CHANNEL M - REAL TIME t

Fig.5b. CHANNEL m - $\tau$ au SPACE $\tau$

point A on Fig. 6

$\tau/T \rightarrow$

Fig. 11.

$\tau/T \rightarrow$

Fig. 10.

$\tau/T \rightarrow$

MULTICHANNEL DIGITAL SIGNAL CORRELATOR OR STRUCTURATOR

BACKGROUND OF THE INVENTION

1. Field of the Invention

This invention concerns a digital correlator or structurator in which a mathematical operation is carried out between non-delayed and delayed data. Such a correlator may perform an auto or cross correlation function.

2. Discussion of Prior Art

In a typical digital correlator an input signal is divided into successive sample intervals. Digital numbers representative of the signal during each sample interval are clocked serially through the correlator for correlation. A series of digital numbers is clocked along an M-stage shift register to form a delayed signal. A non-delayed series of digital numbers is applied to one input of M different multipliers. The other input of these multipliers is taken from successive stages of the shift register. Each multiplier thus operates on a different delay. The output of each multiplier is accumulated in one of M different counters providing M different channels. At the end of an experimental run the collective content of the counters represents the correlation function of the input signal or signals. This correlator may be termeed a linear correlator because the delay between successive channels increaases linearly.

The correlator may perform an auto correlation or a cross corrrelation on data. For an auto correlation the input signal is replicated into two identical signals; one signal is delayed and multiplied by the other non-delayed signal. For a cross correlator a first signal is delayed and multiplied with second, but non delayed, signal.

Digital signal processing enables highly accurate mathematical operations to be carried out on signals. Due to recent advances in logic speed, complicated processing can be carried out in real time. Also advances in the statistical theories of some events have simplified the processing of some functions. One example of this is in laser light scattering experiments, particularly in weak scattering events.

Detailed investigation into the properties of light scattering led to the development of a single clipped digital correlator described in U.S. Pat. No. 3,842,252. This correlator allowed the processing of signals representing the arrival of single photons on a sensitive detector. From this a whole range of work has been made possible, for example, laser light scattering where the light scattered by a suspension of particles in a liquid can be processed to give particle diffusion co-efficients.

In the above linear digital correlator a correlation function is accumulated from information obtained in successive channels. Increasing the number of sample channels allows further information to be obtained but results in increased equipment costs.

One solution to the problem of collecting information from many sample intervals is described in U.S. Pat. No. 4,593,378. In this specification the time delay between each channel is geometrically increased. Thus for example using 26 channels with a $\sqrt{2}$ progression between channels information can be obtained from the equivalent of a delay interval of 8192 in a linear correlator e.g. U.S. Pat. No. 3,842,252. The correlator of U.S. Pat. No. 4,593,378 relies on correlating a signal, at geometrically increasing delays, to obtain the maximum information for a given number of channels. However information is still available from the non-correlated delays. Such uncollected information becomes more important at low counting rates. U.S. Pat. No. 4,593,378 also applies the principle of increasing delays to a measurement of the structure function.

Another correlator is described in U.S. Pat. No. 4,809,210; it extends the data collected from a correlator or structurator such as taught by U.S. Pat. No. 4,593,378, without the increases in equipment channels that would be involved if the linear correlator of U.S. Pat. No. 3,842,252 were merely extended. In U.S. Pat. No. 4,809,210 both the sample time interval and delay time increase in successive channels.

SUMMARY OF THE INVENTION

According to this invention a digital processor comprises
- means for receiving a signal which varies in time forming an input signal,
- means for sampling the input signal and providing a series of digital numbers in successive sample time intervals (Tm);
- a plurality (M) of channels each having
  - a delay for delaying a series of digital numbers by a delay value ($\tau$) to provide a delayed signal,
  - an arithmetic section for receiving at one input a digital signal and at another input the delayed signal and
  - an accumulator for receiving the output of the arithmetic section
  the channels collectively providing a required mathematical operation;
characterised by means in each channel for sampling the input signal to provide a sample time interval (T) and a delay value ($\tau$) that are independent of one another and of other channels.

The arithmetic section may include a multiplying section so the processor becomes a correlator or a difference squarer when the processor becomes a structurator.

The plurality of channels may be provided by a plurality of channels operating simultaneously, or by multiplexing with at least one channel operated successively at different values of sample time and delay values $\tau$ (tau).

The values of delay time $\tau m$ and or sample time interval Tm may be set in successive channels in any required manner, e.g. arithmetic or geometric.

The input signal may be a stream of pulses of varying time separation, e.g. from the output of a photon detector. Alternatively it may be a time varying amplitude analogue signal.

The number of channels in a correlator is defined as M where M is an integer, the small letter m represents any one of the integers 1 to M.

The arithmetic section may comprise a multibit multiplier which multiplies two multibit numbers received in a sample time. Alternatively it may comprise a progressive adder which provides a multiplication by a succession of additions withing a sample time.

Each channel may have a sample time clock giving two ouputs of equal frequency but different phase; the frequency and phase being adjustable and independent.

BRIEF DESCRIPTION OF THE DRAWINGS

The invention will now be described by way of example only with reference to the accompanying drawings of which.

DETAILED DISCUSSION OF PREFERRED EMBODIMENTS

Figure 1:
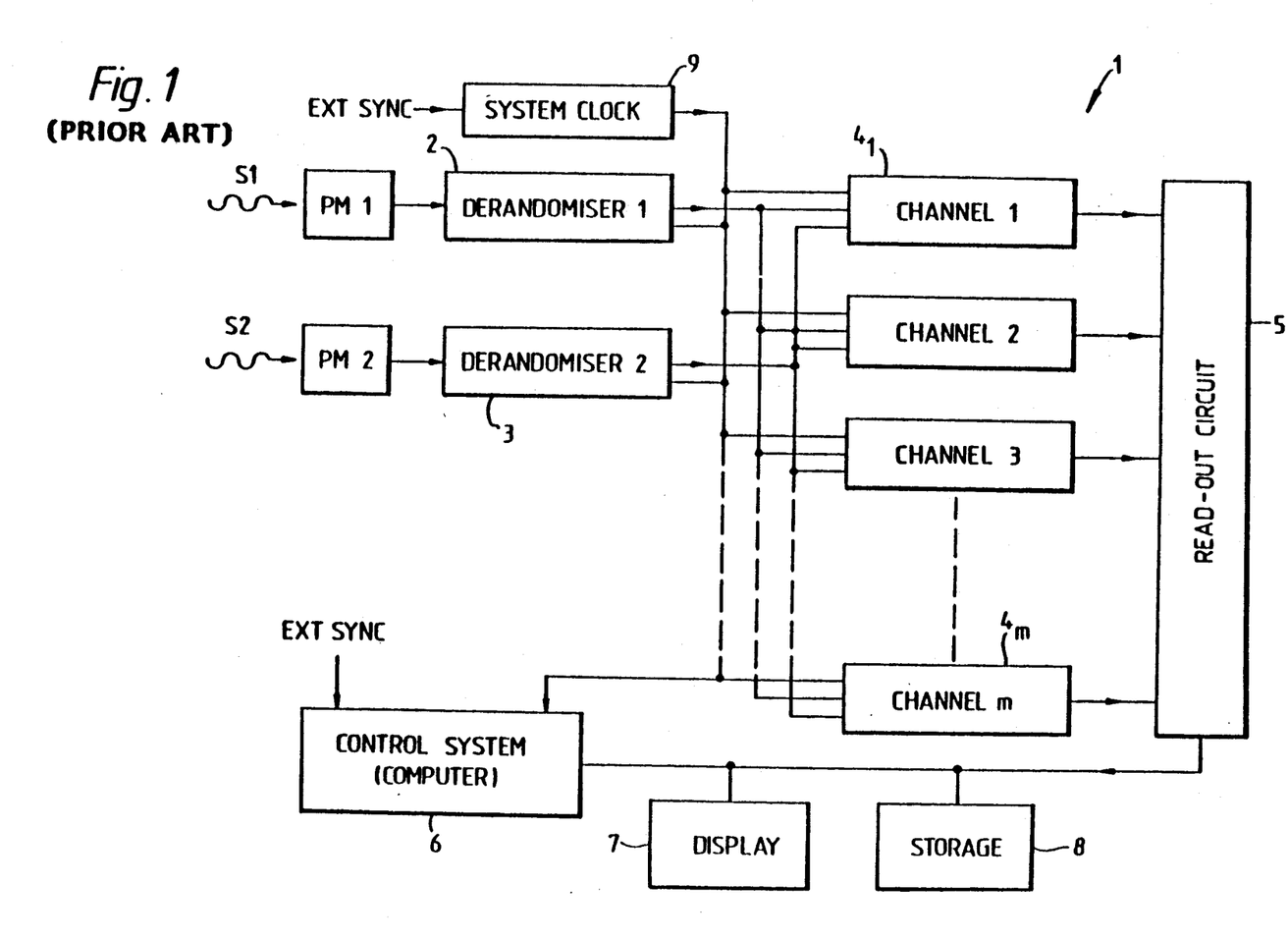
FIG. 1 is a block diagram of a prior art correlator.

The correlator 1 of FIG. 1 is shown to be correlating two signals S1, S2 formed by e.g. light flux from light scattering experiments. The light is detected by photomultipliers PM1, PM2 and fed into derandomisers 2, 3. For most light experiments only a single light flux is received and an autocorrelation function is to be calculated. In this case only one photomultiplier PM1 is used.

Figure 4A:
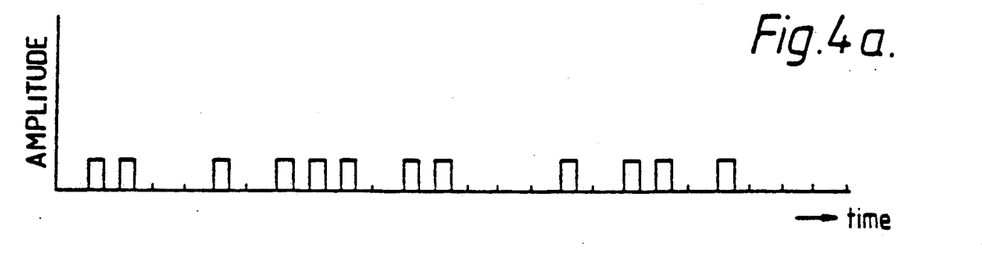
FIGS. 4 to 11 are graphs useful in understanding the present invention.

Output from each photomultipliers 2, 3 is a stream of pulses representing detection of photons in a light flux. These pulses have a random distribution of amplitude and charge. The function of each derandomiser 2, 3 is to take the output of the photomultiplier, or any other similar signal, and produce a pulse of uniform height and width for each photon detected. Two such consecutive pulses will have a minimum separation set by the dead times of the derandomisers 2, 3. Additionally each pulse is synchronised to a basic system clock 9. This allows the subsequent processing to be unambiguous. The result is a train of pulses of varying spacing in time as shown for example in FIG. 4(a).

Outputs from the derandomisers 2, 3 are taken to each channel $4_i$ to $4_M$ of the correlator. A readout circuit 5 receives data from each channel and feeds signals to a controlling logic system, e.g. a digital computer 6, to a CRT display 7, and a recording unit such as a disc or tape store 8. The system clock 9 provides a fundamental frequency for all elements of the correlator; typically the frequency is about 100 MHz.

As an alternative to photomultiplier PM1, PM2, avalanche photo diodes APD may be used and operated in the geiger mode.

Figure 2:
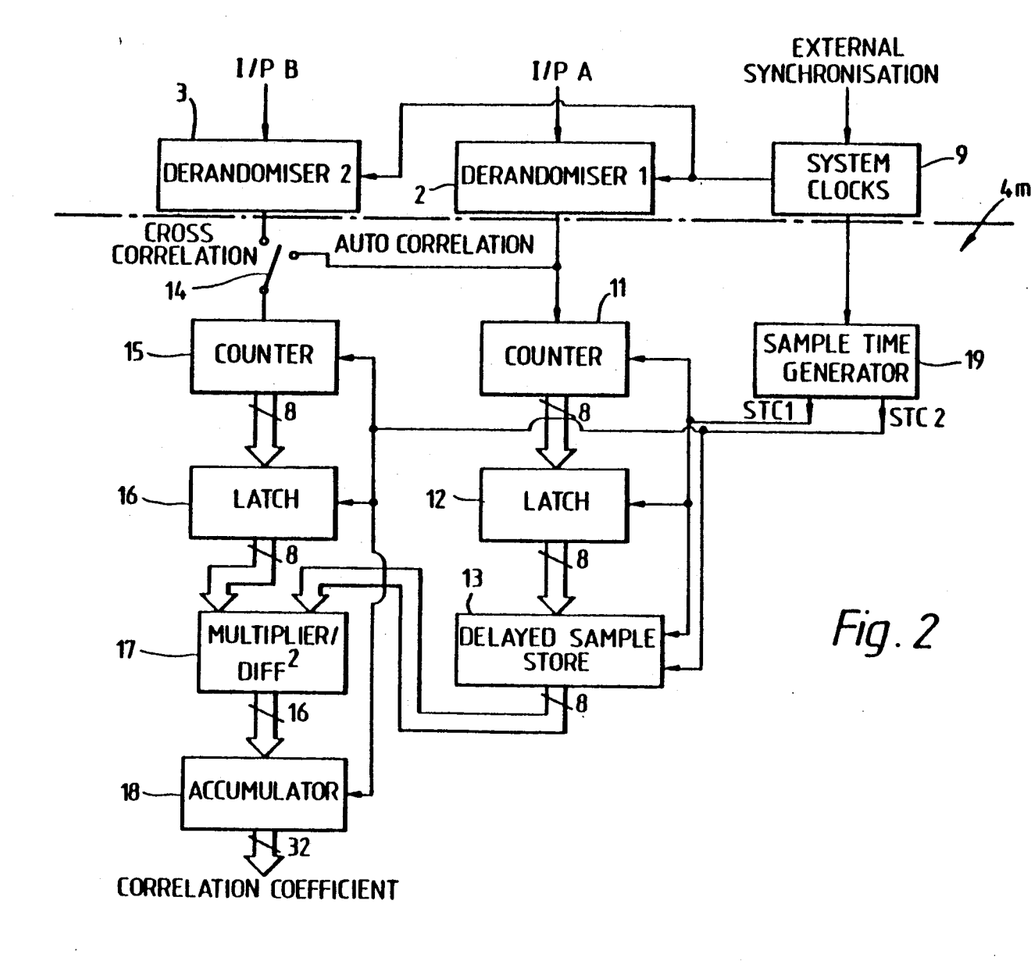
FIG. 2 is a diagram of an improved channel of the correlator of FIG. 1.

The correlator layout of FIG. 1 is common to many correlators. The correlator of the present invention is distinguished by the construction, function and interrelation of each channel as shown in FIG. 2.

Output from the first derandomiser 2 is fed into a counter 11 which counts the number of pulses received in each sample time. The count number is fed via a latch 12 into a delayed sample store 13. Similarly the output of the second derandomiser 3 is fed through a switch 14 into a counter 15. The switch 14 also has an input from the first derandomiser 2 and can be set to receive signals from the second derandomiser 3 when a cross correlation is required, or set to receive signals from the first derandomiser 2 when an auto correlation is required. The counter 15 output is fed through a latch 16 into an immediate input 10 of a multiplier 17. A second, delayed, input DD to the multiplier 17 is from the delayed sample store 13. The output from the multiplier 17 is to an accumulator 18 which accumulates the successive multiplier outputs during an experimental run. The collective outputs of all the accumulators 18 represents the correlation function of an input signal and pass into the read out circuit 5 (FIG. 1).

As shown outputs from both counters 11, 15, latches 12, 16, and store 13 are 8-bit numbers; the multiplier output are 16-bits numbers; and the accumulator output 32-bit numbers.

Figure 4B:
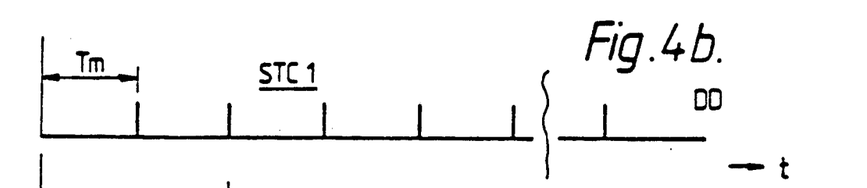
Figure 4C:
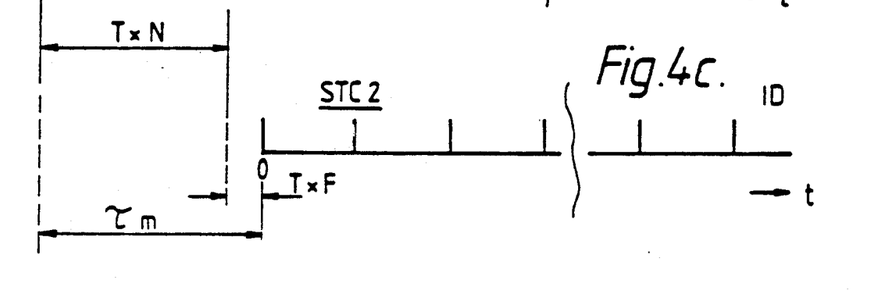

The correlator system clock 9 provides timing pulses to a sample time generator 19. This produces two outputs clock signals, STC 1 and STC2, which clock the counters 11, 15, latches 12, 16 delayed sample store 13 and accumulator 18. FIGS. 4(b), (c) show the timing relation of STC1, STC2 respectively. Both STC1 and STC2 have the same frequency but STC2 is delayed on STC1 by $Tm \times (N+F)$; where N is an integer and F is a variable fraction of Tm from zero to just less than unity. The effect of STC1 applied to the counter 11 latch 12 and delay store 13 is to sample the incoming signal, FIG. 4(a), and form a series of digital numbers each number representing the number of photons received in a sample period Tm. The counter 11 counts the number of pulses received between clocking pulses STC1. On receipt of an STC1 pulse the added count is passed into the latch 12 and then into the delay store 13 before the next STC1 pulse. The sample period Tm in channel m is set by the frequency of STC1 and can be set at a different value in each channel.

Whilst the counter 11 is receiving pulses as above the counter 15 is also receiving pulses from the derandomiser 2 or 3, in sample periods set by the STC2 pulses. However, since the start of STC2 is delayed on STC1 the series of digital numbers from latch 16 are delayed on those first written into the delay store 13 by a delay time $Tm(N+F)$.

The delay store 13 is a FIFO, first in-first out, register. Numbers are clocked in by STC1 and clocked out by STC2. This means that the numbers clocked into the multiplier 17 from the delay store 13, are delayed data DD, which are multiplied with non-delayed, i.e. immediate data ID, from the latch 16. Output from the multiplier 17 is thus a series of numbers formed by multiplication of delayed and non-delayed data numbers. Before STC2 begins the outputs of store 13 at latch 16 are zero.

Operation of a correlator to calculate an auto correlation function will now be described. The calculation of a cross correlation function is similar except that two input signals of different origin are used.

The switch 14 is set to connect the derandomiser 2 to both counters 11, 15. Light from a scattering experiment, e.g. velocity and turbulence measurements in a wind tunnel, are directed at the photomultiplier PM1. The result is a stream of pulses from the derandomiser 2 as in FIG. 4(a). In the channel of FIG. 2 the train of pulses is divided into sample times Tm set by the STC1 and STC2 clocks, and the number of pulses received in each sample time is counted in both counters 11, 15. Delayed data DD from the delay store 13 and non-delayed data ID from the latch 16 are multiplied in the multiplier 17, and result in a series of digital numbers that are accumulated in accumulator 18. At the end of an experimental run the contents of each accumulator 18 are read out and normalised. The collective normalised value from each channel is the auto correlation function for the input signal S1.

To form a structurator the multiplier 17 of FIG. 2 is replaced by a difference squarer circuit.

As mentioned above the values of sample time Tm and delay τm are variable in each channel. The values selected depend on the nature of the experiment being conducted and the accuracy of correlation required.

Some of the effects of varying Tm and (τm) are explained below.

Figure 5A:
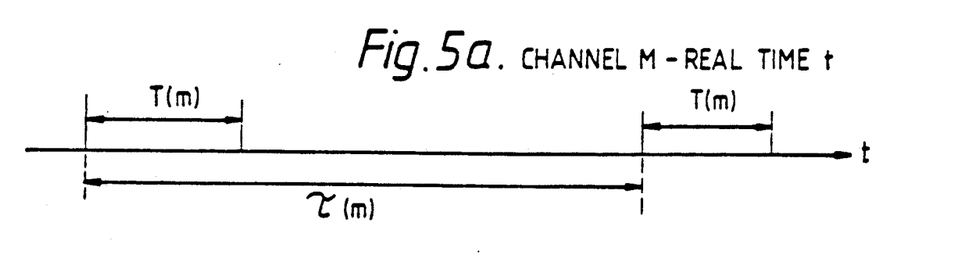
Figure 5B:
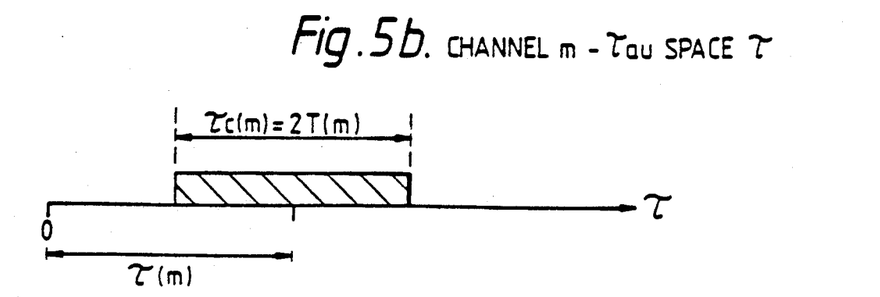

FIGS. 5(a), (b) helps explain the values of delay τ. FIG. 5(a) shows two equal time periods of length Tm separated by a time delay τm. The value of Tm is the sample time in channel m and varies with each channel in accordance with the frequency of its sample time generator outputs STC1, STC2. The value of τm is equal to Tx(N+F) and can be varied in each channel as required. A measure of how much useful information is gathered during a correlation measurement can be obtained by considering the concept of tau space. FIG. 5b shows the coverage in tau space of any m channel. The coverage in each channel τc(m) equals twice Tm, and the position of such coverage is τm.

U.S. Pat. No. 4,809,210 introduces the terms $\alpha$, $\beta$ to describe different sample times and delays in each channel. In that specification:

$$T(m) = aT^{(m-1)} \quad (1)$$

$$T(m) = a^{(m-1)} \cdot T(1) \quad (2)$$

where alpha, $\alpha$ is an integer or non integer with alpha $(m-1)$ rounded to the nearest integer.

$$\tau(m) = \beta \cdot T(m) \quad (3)$$

where beta, $\beta$ is an integer.

In other words $\alpha$ and $\beta$ are constant and related by $$\beta = (\alpha+1)/(\alpha-1)$$

Another characteristic to be considered is the amount of overlap in tau space in adjacent channels, this may be termed an overlap factor OF.

$$OF = [\beta + 1 - \alpha(\beta - 1)]/2$$

Figure 6:
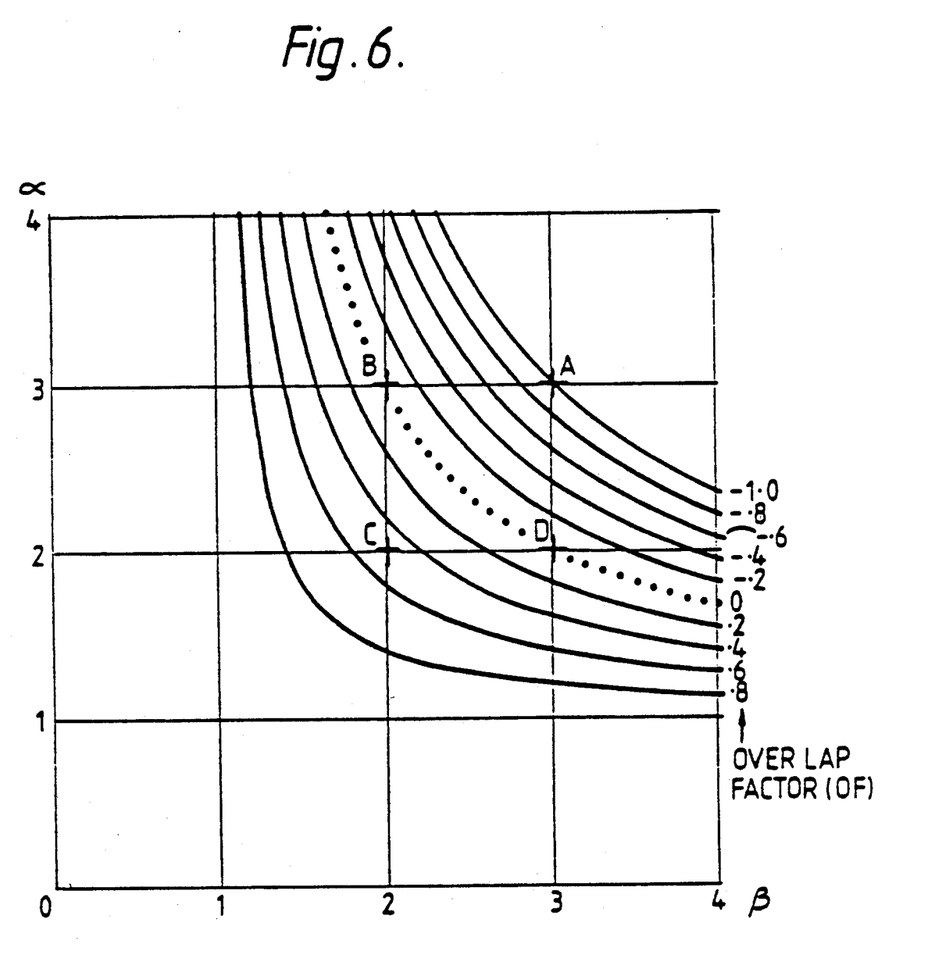

FIG. 6 is a graph of alpha against beta showing lines of constant OF. The dotted line shows a zero OF; moving towards the origin gives increasing overlap and away from the origin decreasing overlap. Moving to the right indicates increasing channels to cover the same tau space and moving upwards indicates fewer channels to cover the same tau space. Both alpha and beta are independent of channel number in this case.

Using these values of alpha, beta, tau space, and overlap factor the earlier correlators may be examined.

Figure 7:
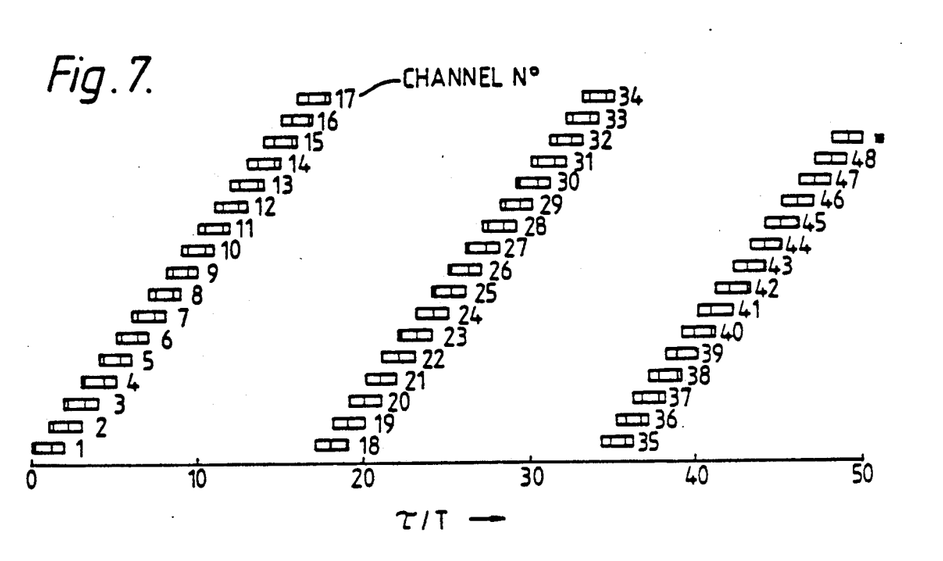

FIG. 7 shows the cover in tau space of U.S. Pat. No. 3,842,252 for a total of 49 channels. The tau coverage is represented by horizontal bars with an associated channel number; the vertical separation is merely to distinguish between channels. The value of alpha is 1 and that of beta is m the channel number. This is achieved by passing a signal into a serial delay and taking the output of successive stages to one input of multipliers. Non delayed signals go direct to a second input of the multipliers.

Figure 8:
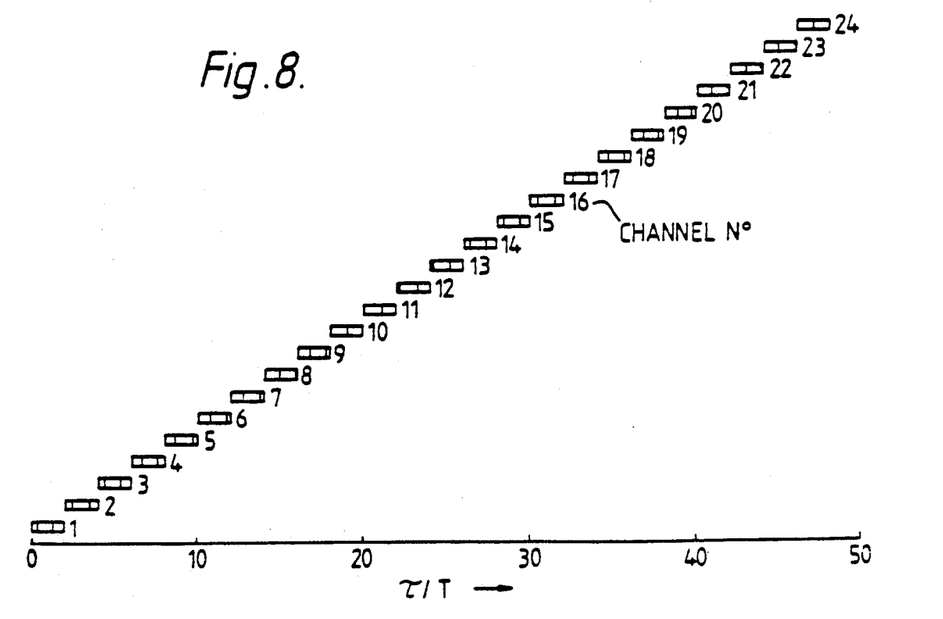

The overlap shown in FIG. 7 could be reduced by keeping alpha=1 and making beta=(2×m)−1. Such values would give zero overlap as shown in FIG. 8 and may be achieved by the circuit of FIG. 2. This would involve making the sample time Tm the same in each channel and increasing the delay in each channel by varying the separation between STC1 and STC2. Such an arrangement needs only 24 channels to cover the same tau space as 49 channels in the arrangement of FIG. 7. The correlator of the present invention is multibit and can therefore correlate multibit input streams whereas U.S. Pat. No. 3,842,252 only operates on single bit values.

Figure 10:
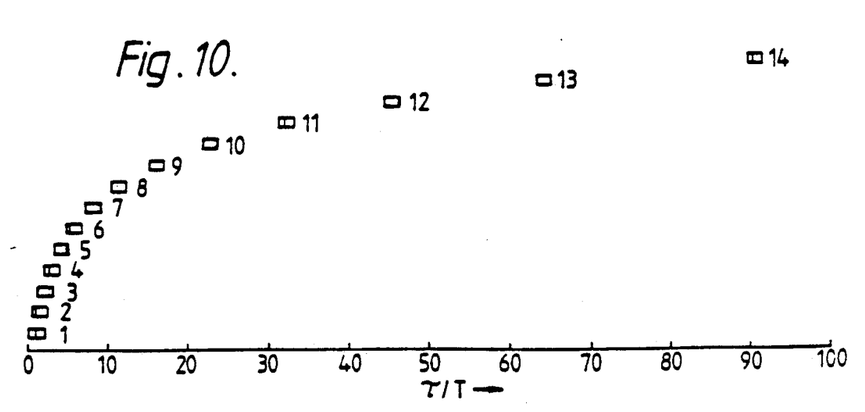
Figure 11:
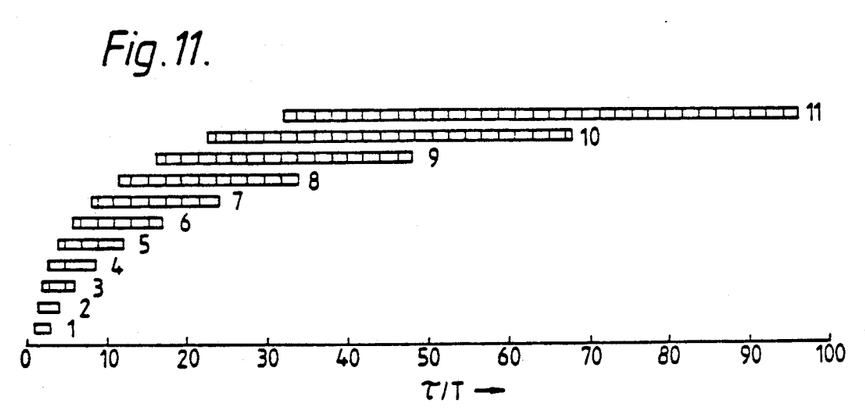

U.S. Pat. No. 4,593,378 a correlator having a variable time delay, tau, between channels. FIG. 10 shows the coverage of tau space by 14 channels for the illustrated embodiment. There are considerable gaps particularly above the seventh channel. The values of alpha=1 and beta=1.414 (m−1) are calculated and practical values then implemented as described. The patent also briefly describes a system where alpha=1.414 and beta =2. This gives a tau space coverage as shown in FIG. 11, with considerable overlap in adjacent channels.

U.S. Pat. No. 4,809,210 describes a system in which the sample time increases in sucessive channels. The value of alpha=2 and beta=3 gives a tau space coverage shown in FIG. 9(b) with no overlap in adjacent channels. Examination of FIG. 6 shows this to be position marked D on the zero overlap curve. From this curve the values of alpha=3 and beta=2 indicated at B also give zero overlap. This is shown in FIG. 9(c).

Figure 9A:
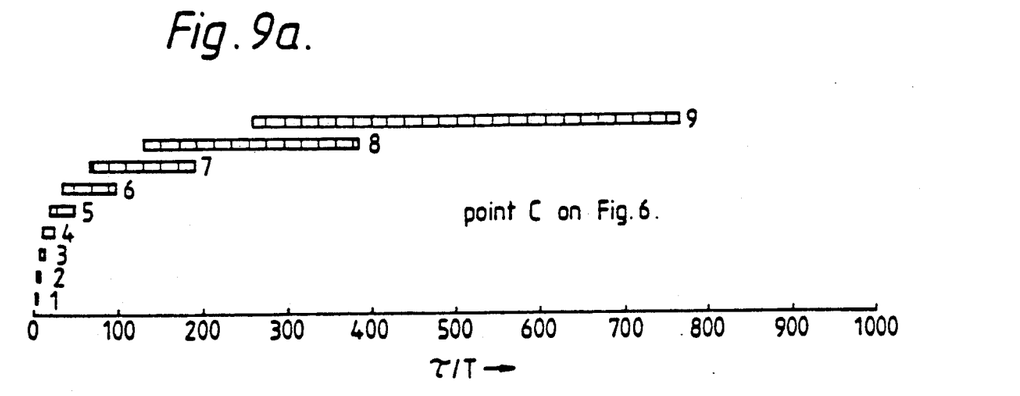
Figure 9B:
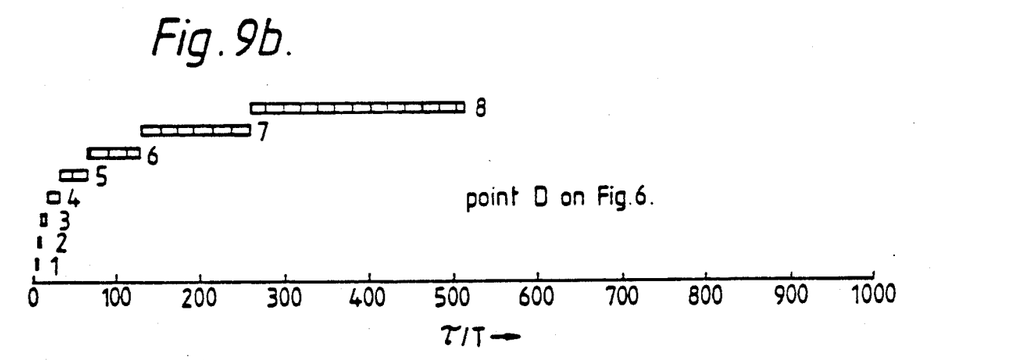
Figure 9C:
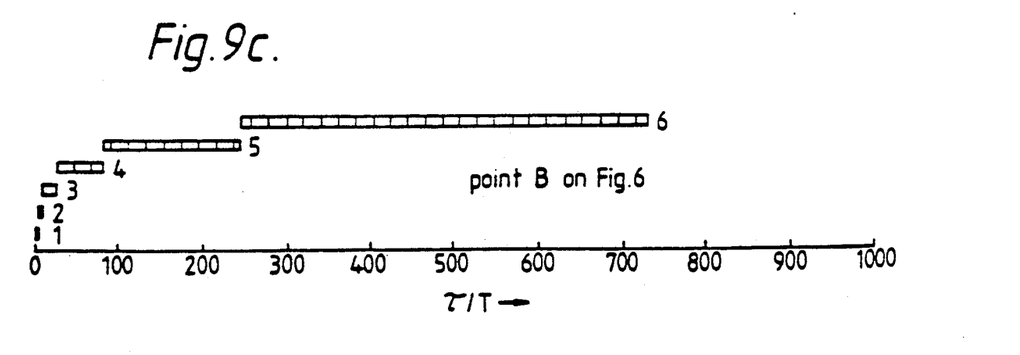
Figure 9D:
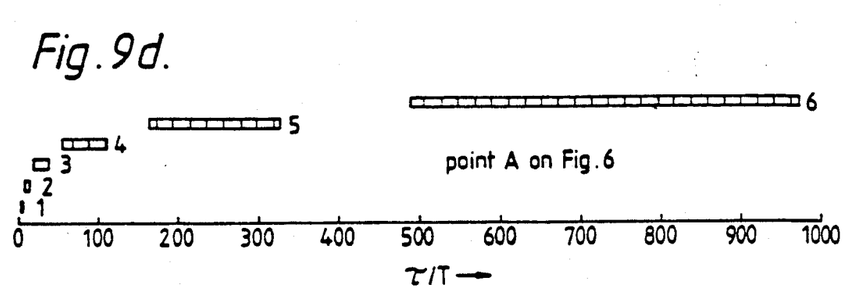

Positions marked C and A of FIG. 6 are shown in FIGS. 9(a) and 9(d) respectively. These indicate the effect of varying the overlap factor by adjustment of $\alpha$, and $\beta$, for constant $\alpha$, $\beta$ correlators.

All the examples of tau space coverage in FIGS. 7, 8, 9, 10, 11 can be achieved by the system of FIG. 2. The value of alpha is varied by selecting the frequency of STC1, STC2 for each channel independantly. The value of beta is varied by selecting the required delay between STC1, STC2 for each channel independantly. The only limit to the variation of alpha and beta is they will be an integer of the system clock frequency. However, this can be made sufficiently high to give very small incremental changes to the values of alpha and beta. Thus the particular calculations obtainable by the prior art correlators are obtainable from the present correlator.

Additionally the present correlator is capable of calculating correlation functions over tau space coverage not possible with the prior art correlators. The present correlator is flexible, i.e. it can be set to operate as any one of the prior art correlators and also in new ways by varying the frequency of and delay between STC1 and STC2.

Figure 3:
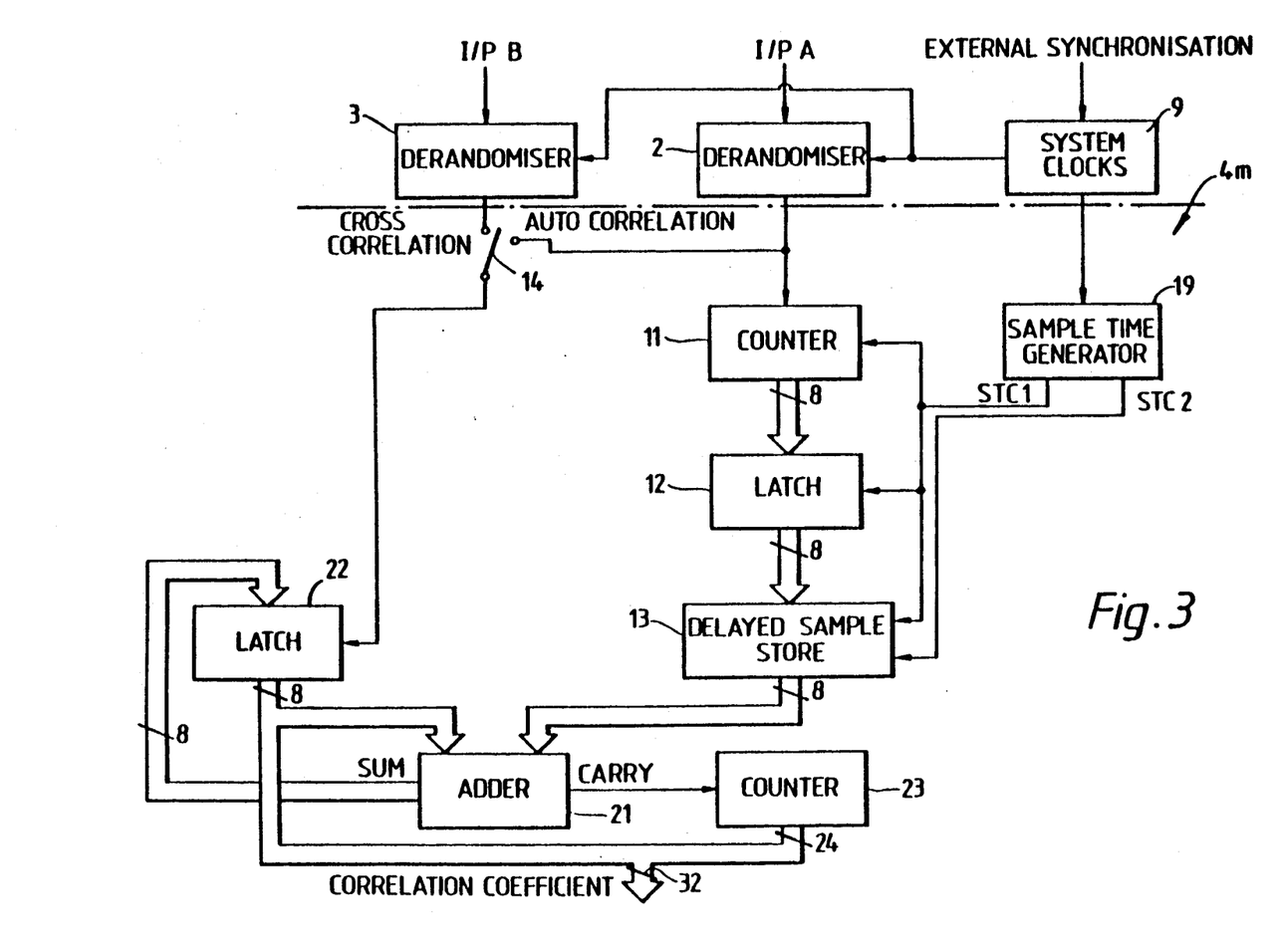
FIG. 3 is an alternative to FIG. 2.

FIG. 3 is an alternative to the system of FIG. 2. Many components are the same and are given like reference numerals. In FIG. 3 there is no multiplier as such; instead a fast adder 21 is employed. As before for auto correlation the output of a derandomiser 2 is fed into a counter 11 to provide numbers in a sample time Tm set by the STC1. From the counter 11 8-bit numbers pass through a latch 12 and into a delayed sample store 13 both clocked by STC1. Output from the delay 13 is timed by STC2 as in FIG. 2. Delayed signals DD pass to one terminal of the adder 21.

Signals from the derandomiser 2, or 3, are fed to a latch 22 Output from this latch 22 is to both the adder 21 and to the readout circuit 5 FIG. 1. The adder 21 has a sum output to the latch and a carry output to a counter 23. Output from this counter 23 forms the upper 24-bit number that combines with output from the latch 22 forming the lower 8-bit number of a 32-bit number representing the channel correlation coefficient.

This combination of adder 21 latch 22 and counter 23 performs a multiplication on pulses received in each sample time Tm. This means the components have to be fast enough to act on pulses spaced typically 50 nanosecs apart. For example if the delayed data is 4 and the none delayed data is 3 then: firstly the value 4 will appear at the adder from the delay 13. Each of the three separately received pulses to latch 22 will clock the value 4 round the adder 21 and latch 22 loop three times resulting in a final output of 12. An advantage of the FIG. 3 system is the reduced number of components. In some cases this reduces the cost. The combination of adder 21 latch 22 and counter 23 forms an accumulator and can be used to form the accumulator 18 of FIG. 2. In this case the latch 22 is clocked by STC 2 instead of a derandomiser output.

The correlator of FIG. 1 is described as a multichannel correlator. However the channel shown in FIGS. 2, 3 can be used to form single channel correlators. A correlation can be performed on a signal with one set of alpha and beta values, and then repeated with different alpha, beta values to cover the required tau space. This may be termed multiplexing and is useful on steady signals or those that change only slowly.

Alternatively a two channel correlator may be used, one channel kept with set values of T(m), $\tau$(m), and the other channel multiplexed with different T(m), $\tau$(m) values. This could be useful for example where a spike is expected in a correlation function. The set channel provides a background reading value and the variable channel moved around in tau space until the spike is detected.

We claim:

1. A digital signal processor comprising means for receiving a signal which varies in time forming an input signal; a plurality of channels each receiving said input signal and providing an output; and means for storing the output from each channel and for providing, from the output of each channel collectively, a required mathematical function output; each channel comprising:

sampling means for sampling said input signal in successive sample time intervals (Tm) and for providing a sampled signal;

delay means for delaying the output of the sampling means by a delay value and providing a delayed signal;

arithmetic means having a first input for receiving a sampled signal, a second input for receiving said delayed signal, and an output for providing the result of a mathematical operation on said sampled and delayed inputs at said output; and accumulator means for receiving the output of the arithmetic means in successive sample time intervals; said sample time intervals (Tm) and delay values ($\tau$m) being independently variable within and between each channel.

2. The digital processor of claim 1 wherein the arithmetic means is a difference squarer and said mathematical function is a structurator.

3. The digital processor of claim 1 wherein the arithmetic means is a multiplier, said mathematical function is a correlation, and said processor is a correlator.

4. The digital processor of claim 3 wherein the input signal is a stream of pulses of varying time separation and the digital processor forms a correlation of a digital signal.

5. The digital processor of claim 3 wherein the input signal is an analogue signal with a time varying amplitude and the sampling means provides a series of digital numbers representing amplitude in successive sample time intervals.

6. The digital processor of claim 3 wherein the plurality of channels is provided by a plurality of similar channels operating simultaneously on data.

7. The digital processor of claim 3 wherein the plurality of channels is provided by at least one channel with means for time multiplexing said channel to cover the required values of delay values.

8. The correlator of claim 7 wherein one channel is set to one value of sample time and delay value (tau), and another channel is time multiplexed to cover a range of sample time and delay value.

9. The correlator of claim 3 wherein the arithmetic means includes a multi-bit multiplier.

10. The correlator of claim 3 wherein the arithmetic means includes a fast adder for multiplexing delayed data with non-delayed data by repeated additions within each sample time.

11. The correlator of claim 3 wherein each channel has a sample time clock with two outputs of identical frequency but different phase, the frequency determining the sample time and the phase difference determining the delay value.

* * * * *